(12) United States Patent
Bhaskaran et al.

(10) Patent No.: US 8,327,461 B2
(45) Date of Patent: Dec. 4, 2012

(54) HIGH-SPEED SCANNING PROBE MICROSCOPE

(75) Inventors: Harish Bhaskaran, New Haven, CT (US); Michel Despont, Rueschlikon (CH); Abu Sebastian, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/146,355

(22) PCT Filed: Jan. 15, 2010

(86) PCT No.: PCT/IB2010/050186
§ 371 (c)(1),
(2), (4) Date: Jul. 26, 2011

(87) PCT Pub. No.: WO2010/086759
PCT Pub. Date: Aug. 5, 2010

(65) Prior Publication Data
US 2011/0289636 A1 Nov. 24, 2011

(30) Foreign Application Priority Data
Jan. 30, 2009 (EP) .................................. 09151749

(51) Int. Cl.
*G01Q 60/14* (2010.01)
*G01N 13/16* (2006.01)
*G01N 13/10* (2006.01)
(52) U.S. Cl. .................. 850/28; 850/26; 850/23; 850/5; 73/105
(58) Field of Classification Search ............ 850/28, 850/26, 23, 5; 73/105
See application file for complete search history.

(56) References Cited

U.S. PATENT DOCUMENTS

| 6,545,470 | B2 * | 4/2003 | Imai et al. ............... 324/244 |
| 7,562,564 | B2 * | 7/2009 | Baba et al. ............... 73/105 |
| 8,222,796 | B2 * | 7/2012 | Bhaskaran et al. ........ 310/330 |

FOREIGN PATENT DOCUMENTS
EP 0 491 973 A1 7/1992
(Continued)

OTHER PUBLICATIONS

Bhaskaran et al., "Nanoscale PtSi Tips for Conducting Probe Technologies", IEEE Transactions on Nanotechnology, IEEE Service Center, Piscataway, NJ, US, vol. 5, No. 1, Jan. 1, 2009, pp. 128-131.

*Primary Examiner* — Nikita Wells
(74) *Attorney, Agent, or Firm* — Scully, Scott, Murphy & Presser, P.C.; Gail H. Zarick, Esq.

(57) ABSTRACT

The invention is directed to a probe for scanning probe microscopy. The probe 20 comprises a tunnel-current conducting part 30 and a tunnel-current insulating part 40. The said parts are configured such that the insulating part determines a minimal distance between the conducting part 30 and the sample surface. The invention may further concern a scanning probe microscope having such a probe, and a corresponding scanning probe microscopy method. Since the distance to the sample surface 100 is actually determined by the insulating part 40, controlling the vertical position of the probe 20 relative to the sample surface is easily and rapidly achieved. The configuration of the parts allows for a fast scan of the sample surface, whereby high-speed imaging can be achieved. Further, embodiments allow for topographical variations to be accurately captured through tunneling effect.

16 Claims, 8 Drawing Sheets

FOREIGN PATENT DOCUMENTS

| | | |
|---|---|---|
| FR | 2 862 156 A1 | 5/2005 |
| JP | 08 262042 A | 10/1996 |
| JP | 2002 168764 A | 6/2002 |
| JP | 2007 147347 A | 6/2007 |

* cited by examiner

HIGH-SPEED SCANNING PROBE MICROSCOPE

FIELD OF THE INVENTION

The invention relates to the field of scanning probe microscopy.

BACKGROUND OF THE INVENTION

Scanning probe microscopy (SPM) is born with the invention of the scanning tunneling microscope. In brief, it aims at forming images of sample surfaces using a physical probe. SPM techniques rely on scanning such a probe, e.g. a sharp tip, just above a sample surface whilst monitoring interaction between the probe and the surface. An image of the sample surface can thereby be obtained. Typically, a raster scan of the sample is carried out and the probe-surface interaction is recorded as a function of position. Data are thus typically obtained as a two-dimensional grid of data points.

The resolution achieved varies with the underlying technique: atomic resolution can be achieved in some cases. Use can be made of piezoelectric actuators to execute motions with a precision and accuracy, at any desired length scale up to better than the atomic scale.

The two main types of SPM are perhaps the scanning tunneling microscopy (STM) and the atomic force microscopy (AFM). The invention of STM was quickly followed by the development of a family of related techniques (including AFM), which together with STM form the SPM techniques.

The interaction monitored in STM is the current tunneling between a metallic tip brought in very close proximity to a conducting substrate. The name arises from the quantum mechanical concept of tunneling. Quantum mechanical tunneling allows for particles to tunnel through a potential barrier which they would not surmount according to the paradigm of classical physics. Yet, in the quantum world, electrons are able to hop through the classically-forbidden space between the tip and the sample.

Imaging of the surface topology may then be carried out in one of two modes:
- in constant height mode, wherein the tunnel current is monitored as the tip is moved parallel to the surface); and
- in constant current mode, wherein the tunnel current is maintained constant as the tip is scanned across the surface and a deflection of the tip is measured.

In AFM techniques, forces between the tip and the surface are monitored; this may be either the short range Pauli repulsive force (in contact-mode) or the longer range attractive force (in non-contact mode, merely van der Waals forces).

In both STM and AFM, the position of the tip with respect to the surface must be very accurately controlled (i.e. to within about 0.1 Å) by moving either the sample or the tip. The tip is usually very sharp—ideally terminating in a single atom at its closest point to the surface.

Probe tips used are typically made of platinum/iridium or gold. In this respect, two main methods for obtaining a sharp probe tip are known: acid etching and cutting. The first method involves dipping a wire end first into an acid bath and waiting until it has etched through the wire and the lower part drops away. The resulting tip can thus often be one atom in diameter at its end. An alternative and quicker method is to take a thin wire and cut it with convenient tools. Testing the tip produced via this method on a sample with a known profile will then indicate whether the tip is suitable or not.

The STM is the actual precursor to the AFM, developed by Gerd Binnig and Heinrich Rohrer in the early 1980s, a development that earned them the Nobel Prize for Physics in 1986. Binnig, Quate and Gerber invented the first AFM in 1986. Since then, a number of variants or improvements of SPM methods and devices have been disclosed.

For the sake of exemplification, U.S. Pat. No. 5,059,793 (A) provides a scanning type tunnel microscope in which a servo system for controlling the distance between the probe and the sample can be set in a proper condition irrespective of the surface condition of the sample. It further discloses a scanning type tunnel microscope capable of setting the starting position of the scanning operation for a desired scanning range to a desired position after the wide range scanning operation is effected without using a rough moving mechanism necessary for movement of the probe in a vertical direction so as to always correctly set the desired position and maintain the reliability of an enlarged image. In particular, a tunnel probe used as a metal probe having a sharp tip end can be supported on a bottom surface of a tube scanner. The tunnel probe is typically mounted to be supplied with a bias voltage by means of a 10-bit D/A converter. On the other hand, a sample is disposed on the top surface. A tunnel current flows in the sample when a preset bias voltage is applied thereto with the tunnel probe set as close as approximately 1 nanometer (nm) to the surface of the sample. The tunnel current flowing in the sample is supplied to a servo circuit, 12-bit A/D converter.

As another example, U.S. Pat. No. 5,546,375 (A) provides a method of manufacturing a fine tip for detecting a fine current or force. The method the steps of: (a) forming a recessed portion in a surface of a first substrate; (b) forming a peeling layer on said first substrate; (c) laminating a fine tip material on said peeling layer; (d) joining said fine tip on said peeling layer to a second substrate; and (e) performing a peeling on an interface between said peeling layer and said first substrate or between said peeling layer and said fine tip to transfer said fine tip onto said second substrate.

As still another example, U.S. Pat. No. 4,874,945 (A) discloses an electron microscope equipped with a scanning tunneling microscope.

Beside the sole patent literature, a number of publications are directed to STM and the manufacture of SPM probes. For example, in a paper entitled "SQUID Probe Microscope Combined With Scanning Tunneling Microscope", Hayashi, T., Tachiki, M., Itozaki, H., Applied Superconductivity, IEEE Transactions on Volume 17, Issue 2, June 2007 Page(s): 792-795 (DOI 10.1109/TASC.2007.898557), a high TC SQUID probe microscope combined with a scanning tunneling microscope for investigation of samples at room temperature in air is described. A high permeability probe needle was used as a magnetic flux guide to improve the spatial resolution. The probe with tip radius of less than 100 nm was prepared by microelectropolishing. The probe was also used as a scanning tunneling microscope tip. Topography of the sample surface could be measured by the scanning tunneling microscope with high spatial resolution. The SQUID probe microscope image could be observed while keeping the distance from the sample surface to the probe tip constant.

BRIEF SUMMARY OF THE INVENTION

In one embodiment, the present invention provides a scanning probe microscope, comprising a tunnel-current conducting probe and an electronic circuitry, adapted to measure, in operation, a tunnel current between the probe and a sample, wherein the probe comprises a tunnel-current conducting part and a tunnel-current insulating part, the parts being configured such that the insulating part determines a minimal distance between the conducting part and a surface of the sample.

In other embodiments, the said scanning probe microscope may comprise one or more of the following features:

The conducting part and the insulating part are configured such that the probe is adapted to self-level on the sample surface;

The scanning probe microscope comprises means for allowing the probe to self-level on the sample surface;

Sensing surfaces of the conducting part and the insulating part are substantially flush;

said insulating part at least partly surrounds the conducting part, the conducting part being for example an inner part of the probe, encapsulated in an outer insulating part;

The conducting part comprises Silicon and Platinum silicide and the insulating part comprises Silicon dioxide;

The insulating part is conformed to ensure that a tunneling current can be directed essentially into the sample.

The invention is further directed, in another embodiment, to a scanning probe method, comprising: providing a scanning probe microscope according to the above embodiment; positioning the sample in the scanning probe microscope; measuring via said circuitry a tunnel current between the probe and the positioned sample.

In further embodiments, the method may comprise one or more of the following features:

The method further comprises acting on the probe, for example applying a force to the probe towards the sample surface;

The method further comprises actuating the probe above the sample surface;

The method further comprises, prior to measuring: providing a probe, wherein the conducting part comprises Silicon and Platinum silicide and the insulating part comprises Silicon dioxide;

Sensing surfaces of the conducting part and the insulating part of the probe of the scanning probe microscope provided are substantially flush.

at the step of providing, the device provided comprises a protruding projection, the method further comprising, prior to measuring, a step of wearing the said projection on a sample surface until sensing surfaces of the conducting part and the insulating part of the device provided are substantially flush.

The method further comprises capturing topographical variations of the sample surface through the tunneling current measured;

In yet another embodiment, the present invention is directed to a probe for a scanning probe microscope, comprising a tunnel-current conducting part; and a tunnel-current insulating part, the parts being configured such that the insulating part determines, in operation, a minimal distance between the conducting part and a surface of a sample to be analyzed via the scanning probe microscope. Preferably, the conducting part and the insulating part are configured such that the probe is adapted to self-level on the sample surface A system and method embodying the present invention will now be described, by way of non-limiting example, and in reference to the accompanying drawings.

DETAILED DESCRIPTION OF THE INVENTION

Figure 1:
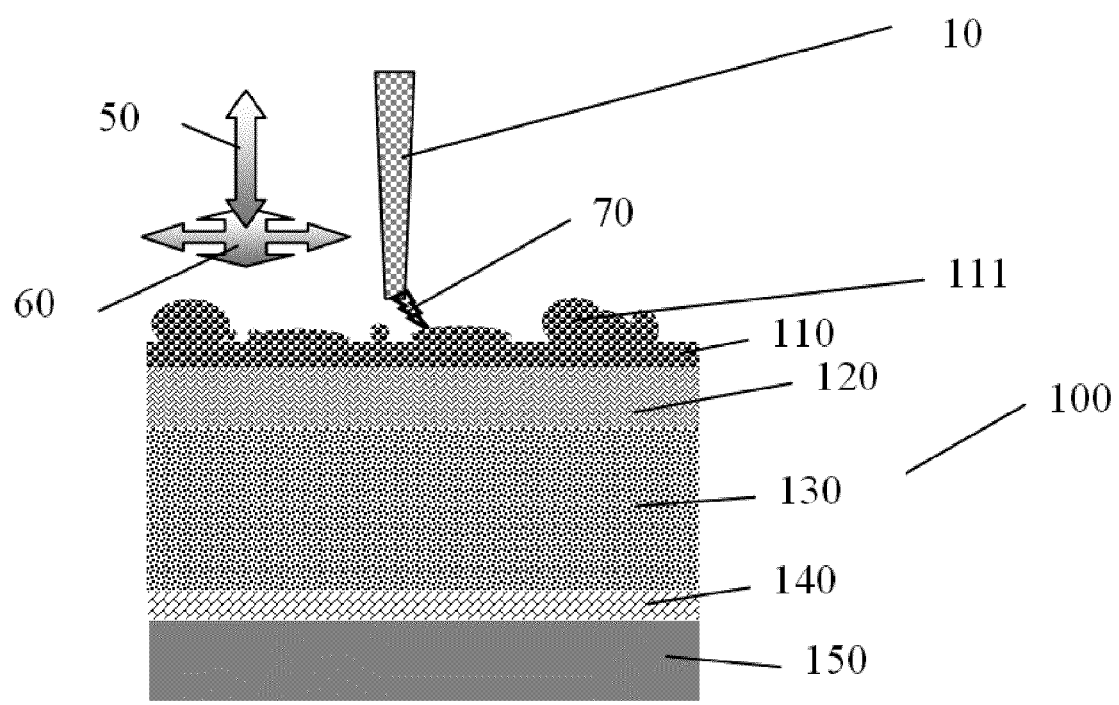
FIG. 1 schematically depicts a section of a SPM probe, as known in the art, in operation above a sample surface.

In reference to FIG. 1, a section of a SPM probe 10 as known in the art is schematically depicted. Such a probe is intended for a scanning tunneling microscope or STM and is accordingly adapted to conduct a tunnel-current.

The corresponding STM may thus comprise an electronic circuitry suitably designed to measure, in operation, a tunnel current 70 between the probe 10 and a sample surface 100, e.g. a conducting substrate in very close proximity to the probe 10. Quantum mechanical tunneling phenomenon allows for electrons to travel the region between the probe 10 and the sample 100.

Engineering solutions, which are known per se, may further be provided such that it is possible to accurately control the relative position of tip and surface, and possibly to ensure good vibrational isolation of the microscope. This can be achieved using sensitive piezoelectric positioning devices, as known in the art. Both a vertical 50 and horizontal 60 controls of the probe are thus typically provided together with the microscope. Imaging of the surface topology may accordingly be carried out in either constant height mode or in constant current mode.

The probe 10 is likely to be raster scanned above the sample surface. Basically, the probe 10 is a fragile, sharp tip, obtained by known methods such as acid etching or cutting. As known, provided accurate positioning controls are available, measuring a deflection signal is likely to provide a reliable measure of topographical changes of the sample surface. On the other hand, a current signal would provide reliable measures of resistance variations.

The sample may for example be composed of several sub-layers 110-150. The layer 110 on top is likely to present surface defects 111, which are known to be likely to impair the scan, especially in constant height mode.

Figure 2:
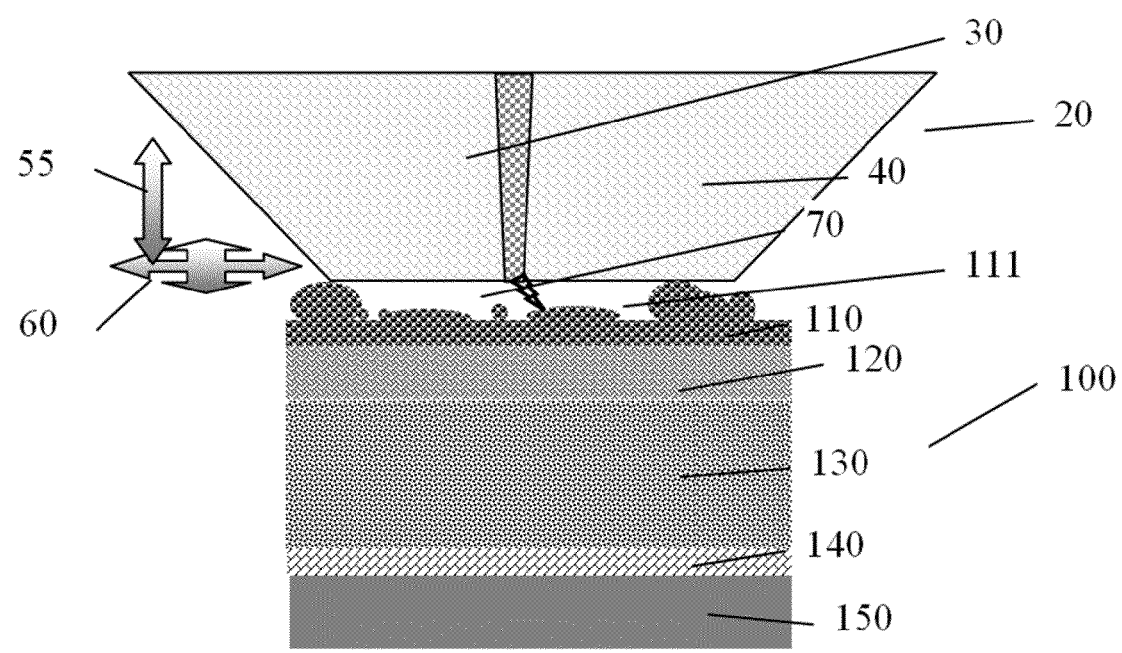
FIG. 2 shows a section view of a SPM probe according to an embodiment of the present invention.

Next, in reference to FIG. 2, a section view as in FIG. 1 is shown, yet pertaining to a SPM probe 20 according to a first embodiment of the present invention. For clarity: the first main embodiment concerns a SPM probe; the second main embodiment is directed to a SPM with such a probe while the third one is a SPM method.

In contrast with the classical tip 10 of FIG. 1, the probe 20 of FIG. 2 comprises a tunnel-current conducting part 30 and a tunnel-current insulating part 40. Importantly, the said parts are furthermore configured such that the insulating part determines a minimal distance between the conducting part 30 and the sample surface.

In a second embodiment of the invention, directed to a SPM apparatus, the above probe 20 may be part of said SPM apparatus. The said SPM apparatus may for instance be an STM apparatus, and accordingly comprise a circuitry to measure a tunnel current 70 between the probe 20 and the sample 100. Monitoring a tunneling current is a known technique and manufacture of the above circuitry is known per se, as discussed in reference to FIG. 1.

In operation, and according to a third embodiment of the invention, a sample 100 is positioned in a SPM apparatus and a tunnel current can be measured via a suitable electronic circuitry between the probe 20 and the positioned sample 100.

Since the distance to the sample surface 100 is actually determined by the insulating part 40, control of the vertical position of the probe 20 relatively to the sample surface is easily and rapidly achieved. In other words, the relative configuration of parts 30, 40 may allow for a self-regulated constant height mode, wherein part 30 is at constant height above the sensed surface. The configuration of the parts makes it possible for a fast scan of the sample surface, whereby high-speed imaging can be achieved. To achieve this, different structural conformations of the parts 30, 40 can be contemplated, as to be discussed later. In particular, specific structural conformations make it possible for topographical variations to be accurately captured through tunneling effect.

The SPM at issue may possibly benefit from convenient solutions to ensure horizontal control 60 of the probe and vibrational isolation, as described earlier. More generally, said SPM may comprise any suitable means 55, 60 acting on the probe. Such means 55 can for instance be designed for applying a force to the probe towards the sample surface. Note however that it suffices to conveniently urge the probe towards the sample. Hence, the accuracy required for vertical control is much less stringent than usual, inasmuch as the distance to the sample surface 100 is otherwise determined by the insulating part 40.

Preferably, the conducting and insulating parts are configured such that the probe is adapted to self-level on the sample surface, as exemplified in FIG. 2. This further drastically simplifies the operation of the probe 20 over the sample surface, whereby fast scan rates are achieved, should the sample surface be damaged by the insulating part.

Figure 13:
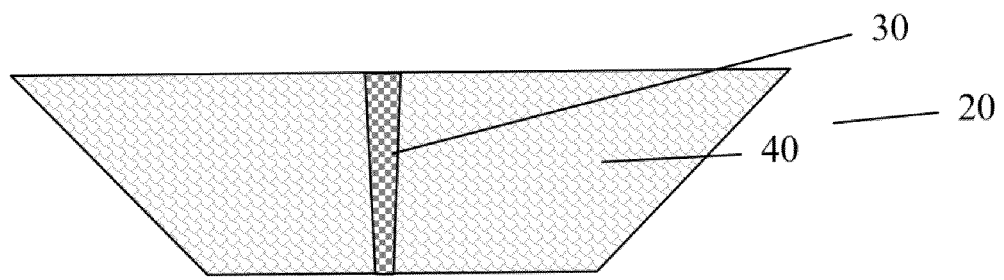
FIGS. 13-15 schematically depict probes according to alternative embodiments of the present invention.
Figure 14:
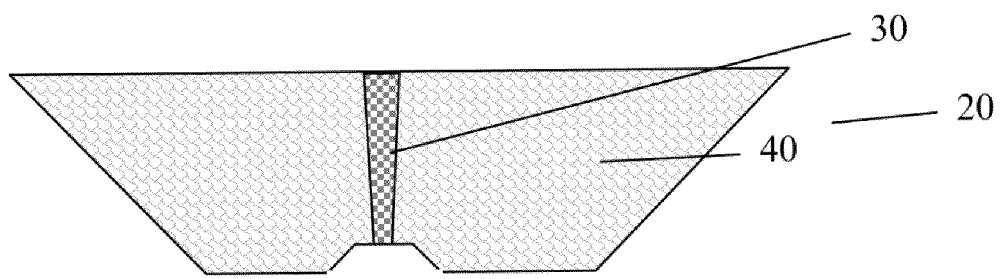
Figure 15:
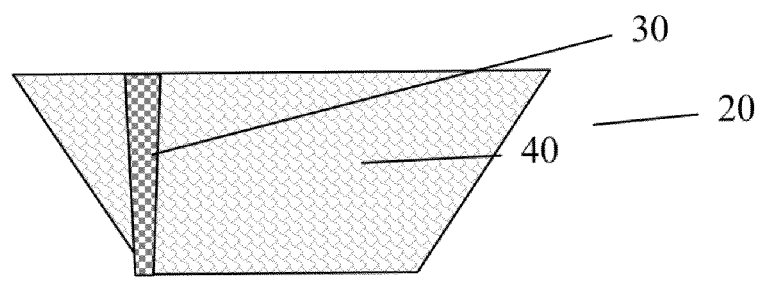

Different structural conformations would be convenient, see FIGS. 13-15. For example, the insulating part 40 may partly or entirely surround the conducting part 30 (FIG. 15). In the example of FIG. 2 or 13, the conductor 30 is entirely surrounded and sensing surfaces of the conducting part and the insulating part are substantially flush. This is however not mandatory, see FIG. 14 or 15. The average section of the insulating part 40 is likely to be substantially larger than the average section of the conducting part 30.

In addition, the skilled person may appreciate that the probe can possibly be designed according to the surface of the sample to be analyzed. For example, the diameter d of the sensing surface of the probe may be set according to an average distance D between defaults or structure details of the sample surface. Preferably, d should be set larger than D. This way, the probe naturally self-levels on the sample surface whilst being scanned above the sample. Yet, should an almost perfectly plane surface (e.g. Si) be contemplated for analysis, d does not need be set according to the surface of the sample.

Referring back to FIG. 2, when brought in contact with the sample surface, the lower surface of the probe 20 meets a surface which is not necessarily even and flat, e.g. it is likely to meet one or more surface defects 111. However, owing to its conformation, the lower surface of the probe may naturally conform to the sample surface.

Hence, not only are the parts 30, 40 configured such that the insulating part 30 determines the minimal distance to the sample, but they may possibly be arranged such that the probe 20 self-levels, i.e. self-adjusts vertically on the surface whilst being scanned above the sample 100.

Yet, dimensions of the conducting part 30 itself remain standard, i.e. small, and even with respect to surface details. Accordingly, while topographical changes would get averaged out when measuring a deflection signal, measuring a current signal is likely to accurately capture topographical variations through tunneling effect.

Note that lower surfaces of insulating and conducting parts need not be necessarily flush (as in FIG. 2 or 13). On the contrary, the lower surface of the conducting part may be slightly shifted inwardly with respect to that of the insulating part (see FIG. 14), whereby physical protection of the conducting part is provided. Such a configuration of the probe may however be more difficult to engineer, as the probe need be worn about the conductor. Hence, parts 30, 40 may be configured such that the insulating part 30 determines the minimal distance to the sample surface, while making it unlikely that the lower surface of the conducting part make contact with the sample surface.

Figure 3:
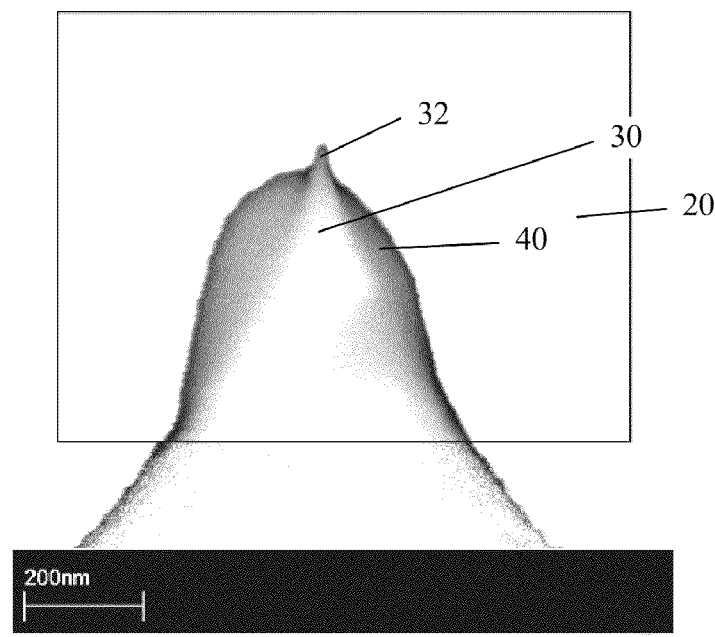
FIGS. 3 and 4 are inverted color bitmaps of SPM probes according to embodiments of the invention, before and after wearing an end tip of the probe, respectively.
Figure 4:
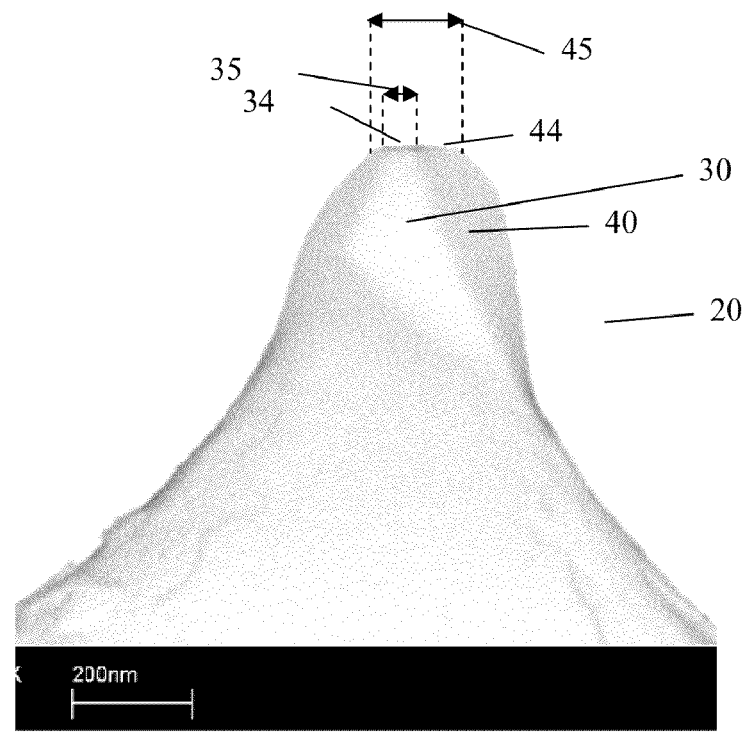

Other conformation of parts 30, 40 might be contemplated, as to be discussed notably in reference to FIGS. 3 and 4.

For completeness, note that the sample 100 may once more be composed of several sublayers 110-150. In the example of FIG. 2, the layer 110 on top is doped Carbon, of approximately 6 nm. It likely exhibits surface defects 111. The next layer 120 is a 20 nm amorphous GST, i.e. an amorphous phase of $Ge_2Sb_2Te_5$. Underneath is another thicker doped Carbon layer 130 (here of 128 nm, the scale of the figure is not meant to be realistic). Subsequent layers 140, 150 might be $SiO_2$ and Si.

Next, FIG. 3 is an inverted color bitmap of a SPM probe at an early stage of its elaboration, as used in a method according to an embodiment of the invention. As before, the probe 20 comprises a tunnel-current conducting part 30 and a tunnel-current insulating part 40. The conducting part is in this example an inner part of the probe, encapsulated within the outer insulating part. Incidentally, orientation of the probe is reversed compared with FIG. 2, such that the sensing surfaces of parts 30, 40 are now on top.

In the example of FIG. 3, the conducting part 30 comprises Silicon and Platinum silicide and the insulating part comprises Silicon dioxide, which turns convenient for manufacture Such a tip can be manufactured using nano and/or microfabrication techniques, yet suitably adapted for the present purpose. For instance, the tip can be manufactured by coating an existing sharp conducting cantilever (such as a silicon microcantilever with a tip apex of platinum silicide) with a dielectric (such as Silicon dioxide deposition using plasma-enhanced chemical vapor deposition) and then etching such a material down until the conducting core is exposed.

In addition, the conducting part 30 shows a projection 32 protruding from the insulating part 40. Thus, the said parts 30, 40 are not yet configured such that the insulating part determines a minimal distance to the sample surface.

To achieve an operational probe, the method according to the invention may, in an embodiment, further comprise a step of wearing said projection 32 on a sample surface until sensing surfaces of the conducting part and the insulating part of the device provided are substantially flush, as depicted in FIG. 4. In other words, the small projection 32 of Si is worn down until it is flush with the oxide 40. At this point, the wear slows drastically because of the increase in the contact area.

In FIG. 4, an inverted color bitmap of the SPM probe of FIG. 3 is shown, as of after wearing the projection 32 of the probe. Note that the view of FIG. 4 is rotated above a vertical axis, in comparison with FIG. 3.

In this example, the conducting part sensing surface 34 has an average radius 35 of approximately 47 nm, while the insulating part sensing surface 44 has a substantially larger average radius 45, here approximately 147 nm.

Owing to the configuration obtained for the probe 20 at this point, the insulating part 30 now determines a minimal distance to the sample. In addition, parts 30, 40 are further configured such that the probe 20 may self-level on a sample surface, as discussed earlier, at least with respect to surface details spaced by less than the minimal diameter of the sensing surface of the outer insulating ring.

In addition, the insulating part may, as in the example of FIGS. 3 and 4, be conformed such as to direct a tunneling current essentially into the sample, in operation. To achieve this, the insulating part is likely to be sufficiently impermeable to electrons such that the path of least resistance for the electrons is along the core to or from the sample. This way, unwanted fringe tunneling current effects are reduced, if not eliminated. Furthermore, this greatly enhances lateral resolution and accuracy.

Figure 5:
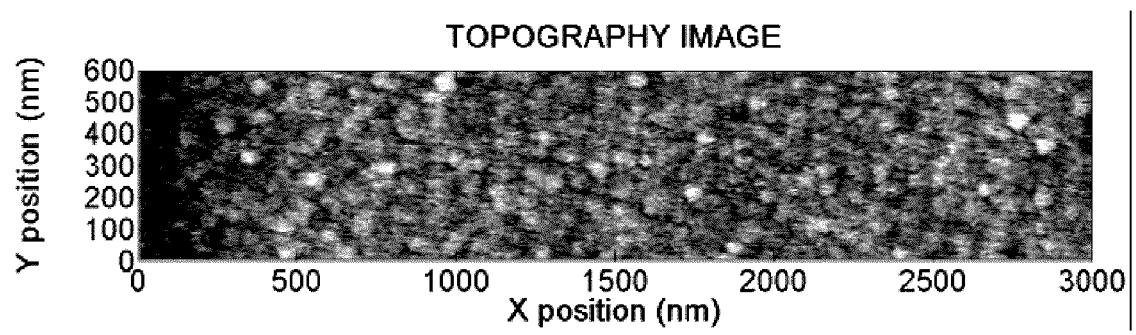
FIG. 5 shows a SPM topographical image as obtained from a standard tip.

FIG. 5 shows a SPM topographical image as obtained from a standard tip, as discussed earlier in reference to FIG. 1. Contact mode imaging was performed using a custom-made set-up comprising a photodiode that monitors the cantilever displacement orthogonal to the sample surface, thus measuring the surface, and for the sake of comparison with results obtained with the probe according to an embodiment of the present invention.

The image of FIG. 5 represents topographical variations along an X-Y plane. Units along both axes are nanometers (nm). The X and Y axes numerals indicate the position of the cantilever during the scan.

Figure 6:
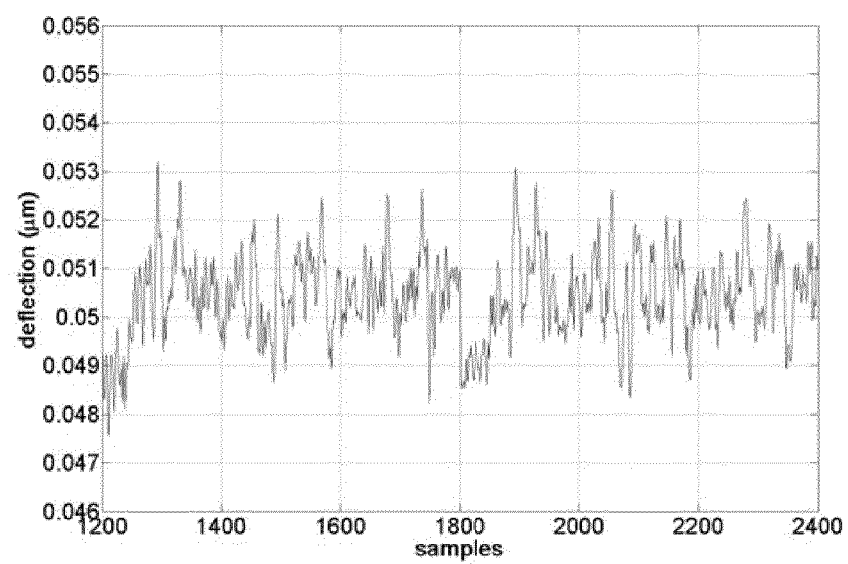
FIG. 6 exhibits a corresponding deflection signal.

Topographical variations are captured reliably within the resolution limits set by the tip radius. In particular, the topographical variations captured are less than 2 nm (vertically), as can be appreciated in FIG. 6, showing a cross section of FIG. 5, which is the corresponding deflection signal along a particular line in the X-Y plane. Indeed, in FIG. 6, units used for the vertical axis are micrometer (μm) and variations less than 0.002 μm are indeed visible.

Figure 7:
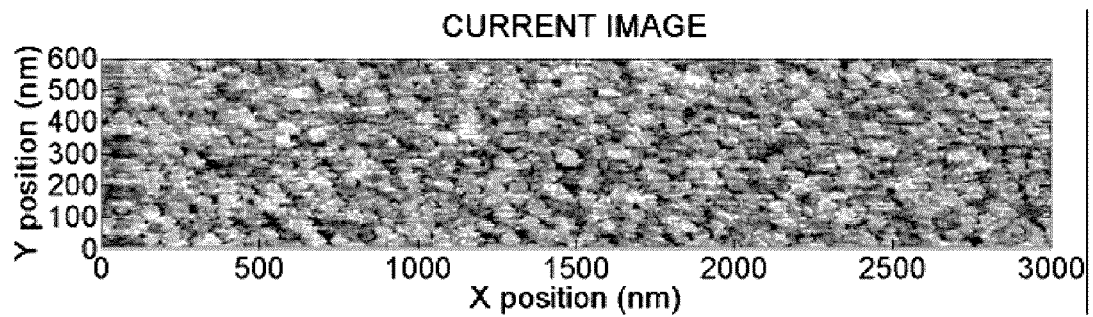
FIG. 7 shows a SPM current image as obtained from the same standard tip.
Figure 8:
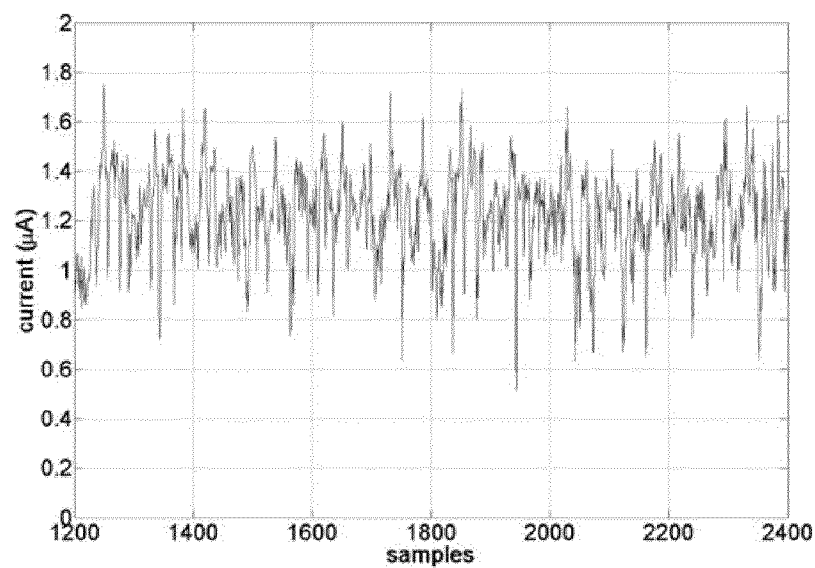
FIG. 8 is the corresponding current signal.

FIGS. 7 and 8 are similar to FIGS. 5 and 6 except they reflect results obtained in current mode (units of the vertical axis in FIG. 8 are microamperes (μA)). The current image and signal are obtained using the same standard tip as in FIGS. 5 and 6. Here, current signal varies as the surface varies and the signal resolution does not exceed the resolution limit of the tip.

Next, FIGS. 9-12 show counterpart results of FIGS. 5-8, yet obtained according to an embodiment of the present invention. In particular, the probe used is configured such that the insulating part determines a minimal distance to the sample surface.

Figure 9:
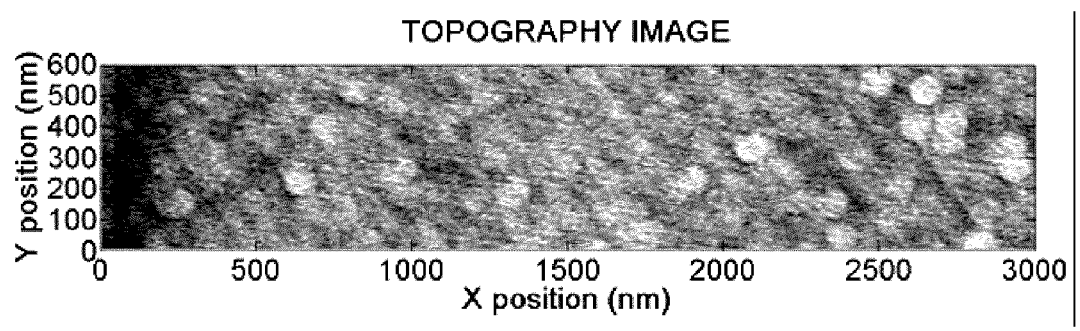
FIGS. 9-12 show counterpart results of FIGS. 5-8, obtained with a probe according to an embodiment of the present invention.
Figure 10:
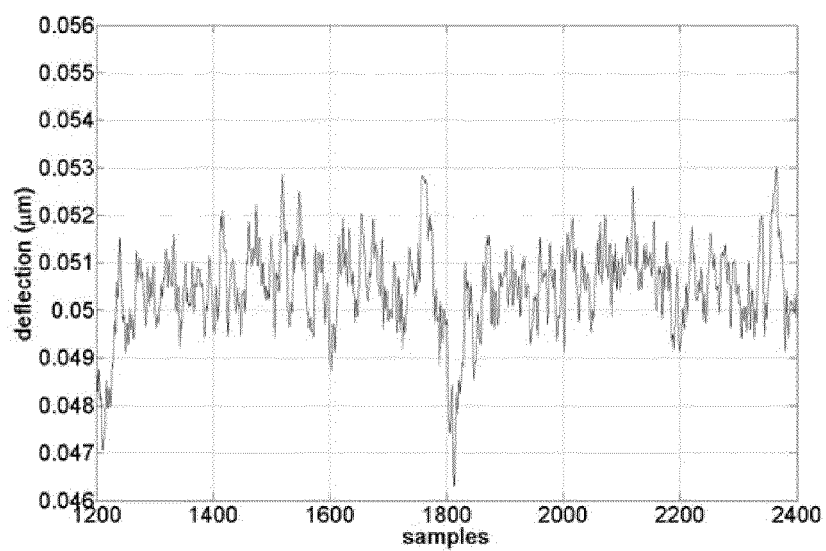

In FIG. 9, topographical features have been averaged out, as expected, since the probe sensing surface is substantially larger than that of the standard tip used in FIGS. 5-8. The feature sizes now appear to be the size of the tip.

Figure 11:
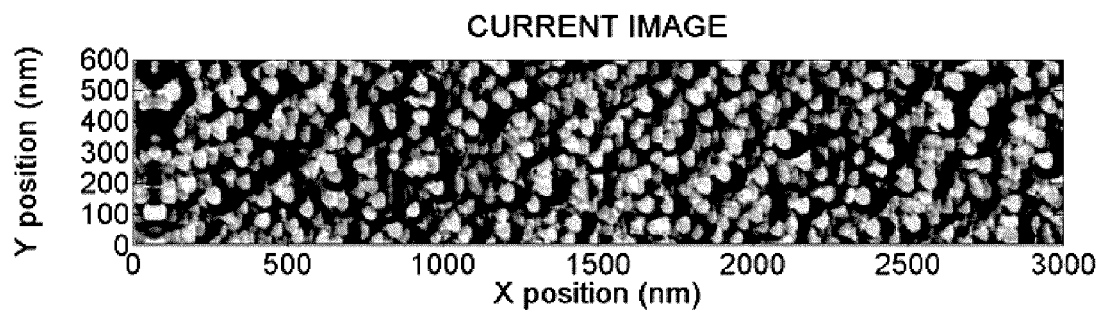
Figure 12:
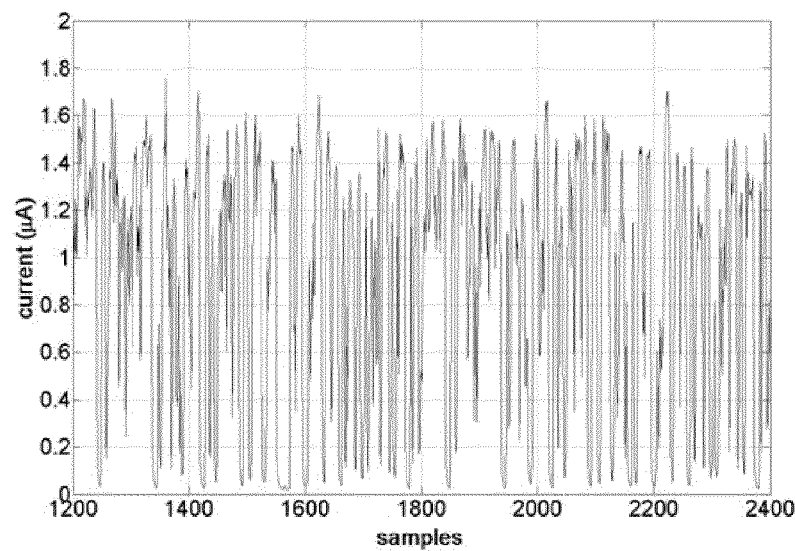

However, images of FIGS. 11-12 show impressive contrasts, largely improved with respect to FIGS. 7-8. Huge variations in current are now to be seen, see FIG. 12. In fact, it looks like topographical features are now appearing in the current image, with very high resolution.

In addition, it is worth reminding that all embodiments of the present invention allows to get rid of the need to accurately regulate a fixed probe-sample separation, owing to the relative configuration of both the insulating and conducting parts. For the same reasons, the probe can be operated at very high speed, in comparison with known solutions. Typical speeds of 0.1 mm/s in the above set-up have been achieved, but this could be significantly increased. Even, since the probe is likely to be larger and more resistant than a standard sharp tip, the probe can be used a destructive probe means. More explicitly, the probe can be raster scanned above the surface at such speed that surface defects and/or the tip apex would be destroyed by the probe.

Finally, FIGS. 13-16 show schematic representations of various probe sections, according to further embodiments of the invention. The probe 20 comprises here again a tunnel-current conducting part 30 and a tunnel-current insulating part 40, the parts being configured such that the insulating part determines, in operation, a minimal distance between the conducting part 30 and a surface of a sample to be analyzed via the SPM.

In FIG. 13, the probe 20 is just the same as in FIG. 2.

In FIG. 14, the insulating part is slightly shifted inwardly, as evoked earlier.

In FIG. 15, the insulating part is not encapsulated, i.e. not entirely surrounded by the insulating part 40. Yet, as configured, the insulating part determines the minimal distance to the sample, as discussed at length above. Similarly, various asymmetries can be contemplated.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims. For example, other material than those mentioned above may be used to manufacture a probe according to the invention.

The invention claimed is:

1. Scanning probe microscope, comprising:
   a tunnel-current conducting probe; and
   an electronic circuitry, adapted to measure, in operation, a tunnel current between the probe and a sample,
   wherein the probe comprises:
   a tunnel-current conducting part; and
   a tunnel-current insulating part,
   the parts being configured such that the insulating part determines a minimal distance between the conducting part and a surface of the sample.

2. The scanning probe microscope of claim 1, wherein the conducting part and the insulating part are configured such that the probe is adapted to self-level on the sample surface.

3. The scanning probe microscope of claim 1, further comprising:
   means for acting on the probe, for example means for applying a force to the probe towards the sample surface.

4. The scanning probe microscope of claim 1, wherein sensing surfaces of the conducting part and the insulating part are substantially flush.

5. The scanning probe microscope of claim 1, wherein said insulating part at least partly surrounds the conducting part, the conducting part being for example an inner part of the probe, encapsulated in an outer insulating part.

6. The scanning probe microscope of claim 1, wherein the conducting part comprises Silicon and Platinum silicide and the insulating part comprises Silicon dioxide.

7. The scanning probe microscope of any one of claim 1, wherein the insulating part is conformed to ensure that a tunneling current can be directed essentially into the sample.

8. A scanning probe method, comprising:
providing the scanning probe microscope of claim 1
positioning the sample in the scanning probe microscope; and
measuring via said circuitry a tunnel current between the probe and the positioned sample.

9. The method of claim 8, further comprising:
acting on the probe, for example applying a force to the probe towards the sample surface.

10. The method of claim 9, further comprising:
actuating the probe above the sample surface.

11. The method of claim 8, further comprising, prior to measuring:
providing a probe, wherein the conducting part comprises Silicon and Platinum silicide and the insulating part comprises Silicon dioxide.

12. The method of claim 8, wherein sensing surfaces of the conducting part and the insulating part of the probe of the scanning probe microscope provided are substantially flush.

13. The method of claim 8, wherein at the step of providing, the device provided comprising a protruding projection, the method further comprising, prior to measuring, a step of:
wearing the said projection on a sample surface until sensing surfaces of the conducting part and the insulating part of the device provided are substantially flush.

14. The method of claim 8, further comprising:
capturing topographical variations of the sample surface through the tunneling current measured.

15. A probe for scanning probe microscopy, comprising
a tunnel-current conducting part; and
a tunnel-current insulating part,
the parts being configured such that the insulating part determines, in operation, a minimal distance between the conducting part and a surface of a sample to be analyzed via the scanning probe microscope.

16. The probe of claim 15, wherein the conducting part and the insulating part are configured such that the probe is adapted to self-level on the sample surface.

* * * * *